United States Patent
Nakai et al.

(10) Patent No.: US 6,216,810 B1
(45) Date of Patent: *Apr. 17, 2001

(54) FRONT END MODULE STRUCTURE OF VEHICLE

(75) Inventors: Kiyotaka Nakai, Chita; Yoshiaki Yamamoto, Aichi-ken, both of (JP)

(73) Assignee: Aisin Seiki Kabushiki Kaisha, Aichi-Pref (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/045,907

(22) Filed: Mar. 23, 1998

(30) Foreign Application Priority Data

Mar. 26, 1997 (JP) ...................................... 9-073955

(51) Int. Cl.⁷ ...................................... B06K 11/04
(52) U.S. Cl. .......................................... 180/68.4; 296/194
(58) Field of Search ................................ 180/68.4, 68.6; 296/194, 30, 203.02; 156/303.1, 293

(56) References Cited

U.S. PATENT DOCUMENTS

| | | | |
|---|---|---|---|
| 3,583,756 | 6/1971 | Wilfert | 296/31 |
| 4,530,147 | 7/1985 | Mattei et al. | 29/525 |
| 4,904,511 | * 2/1990 | Barberis | 428/133 |
| 5,077,885 | 1/1992 | Kanemitsu et al. | |
| 5,123,695 | 6/1992 | Kanemitsu | 296/194 |
| 5,271,473 | 12/1993 | Ikeda et al. | 180/68.4 |
| 5,575,526 | 11/1996 | Wycech | 296/205 |
| 5,597,047 | 1/1997 | Thompson et al. | 180/68.4 |
| 5,658,041 | 8/1997 | Girardot et al. | 296/194 |

FOREIGN PATENT DOCUMENTS

| | | |
|---|---|---|
| 0658470B1 | 5/1997 | (EP) . |
| 5-105115 | 4/1993 | (JP) . |

* cited by examiner

Primary Examiner—J. J. Swann
Assistant Examiner—David R. Dunn
(74) Attorney, Agent, or Firm—Reed Smith Hazel & Thomas LLP

(57) ABSTRACT

A front end module structure of a vehicle comprises a front end panel mounted on front side members of the vehicle, the front end panel including a metal-made upper reinforcement extending in the widthwise direction of the vehicle and having a horizontally thrown U-shaped, or closed, sectional configuration and a resin-made main body formed integrally with the upper reinforcement and so formed on the upper reinforcement that a part thereof may intrude into the sectional configuration thereof, the resin-made main body having formed therein at least a retaining portion, by which a radiator is retained, and an upper reinforcement portion fixed to front fender reinforcements of the vehicle. As a result of this, there is enhanced the rigidity of the upper reinforcement portion of the front end panel.

3 Claims, 5 Drawing Sheets

FRONT END MODULE STRUCTURE OF VEHICLE

BACKGROUND OF THE INVENTION

The present invention relates to a front end module structure of a vehicle which is composed of a resin-made front end panel adapted to retains at least a radiator of the vehicle.

Conventionally, this type of front end module structure is known, for example, which is illustrated in the Japanese Patent Laid-Open Publication No. Hei 5-105115. This conventional structure has a resin-made front end panel adapted to be mounted to opposed front side members of a vehicle and having at least a retaining portion by which a radiator of the vehicle is retained. The front end panel of this conventional structure has an upper reinforcement portion that are fixed at both ends to opposed front fender reinforcements of the vehicle, respectively. However, in the above-described conventional structure, the upper reinforcement portion is made of resin as in the case of the radiator retaining portion. Therefore, the upper reinforcement portion is disadvantageous in terms of the rigidity. Especially, for example, in a case where a lock device for retaining a bonnet of the vehicle is provided on this upper reinforcement portion, the upper reinforcement portion does not sufficiently bear the load at the locking time and therefore is likely to become short of the strength.

SUMMARY OF THE INVENTION

The present invention has been made under the above-mentioned circumstances and has an object to provide a front end module structure of a vehicle in which there is enhanced the rigidity of the upper reinforcement portion of the front end panel.

To attain the above object, according to the present invention, there is provided a front end module structure of a vehicle comprising a resin-made front end panel adapted to be mounted at both ends on a pair of opposed front side members of the vehicle and having at least a radiator retaining portion adapted to retain the radiator thereto, an upper reinforced portion adapted to be fixed to a pair of opposed front fender reinforcements of the vehicle and opposed rib-like flanges downwardly extending from the upper reinforced portion, and a metal-made reinforcement member molded integrally with the upper reinforced portion and having a plurality of holes in which the resin material of the upper reinforced portion is filled.

According to the present invention, there is further provided a front end module structure of a vehicle which comprises a front end panel mounted on front side members of the vehicle, the front end panel including a metal-made upper reinforcement extending in the widthwise direction of the vehicle and having a horizontally thrown U-shaped, or closed, sectional configuration and a resin-made main body formed integrally with the upper reinforcement and so formed in the upper reinforcement that a part thereof may intrude into the sectional configuration thereof, the resin-made main body having formed therein at least a retaining portion, by which a radiator is retained, and an upper reinforcement portion fixed to front fender reinforcements of the vehicle.

According to this technical means, there is provided a metal-made upper reinforcement. Therefore, the upper reinforcement portion of the front end panel is reinforced by this upper reinforcement. As a result of this, the rigidity of the upper reinforcement portion of the front end panel is enhanced.

More preferably, there is provided a bent or folded flange formed by cutting out a lower wall of the upper reinforcement and downwardly extending so that the bent flange may be substantially parallel with a front wall of the upper reinforcement, a vertical frame portion of the retaining portion being formed so as to cover the bent flange.

BRIEF DESCRIPTION OF THE DRAWINGS

The above and other objects, features and advantages of the present invention will become apparent from the following description when the same is read in conjunction with the accompanying drawings in which.

DESCRIPTION OF THE PREFERRED EMBODIMENTS

Figure 1:
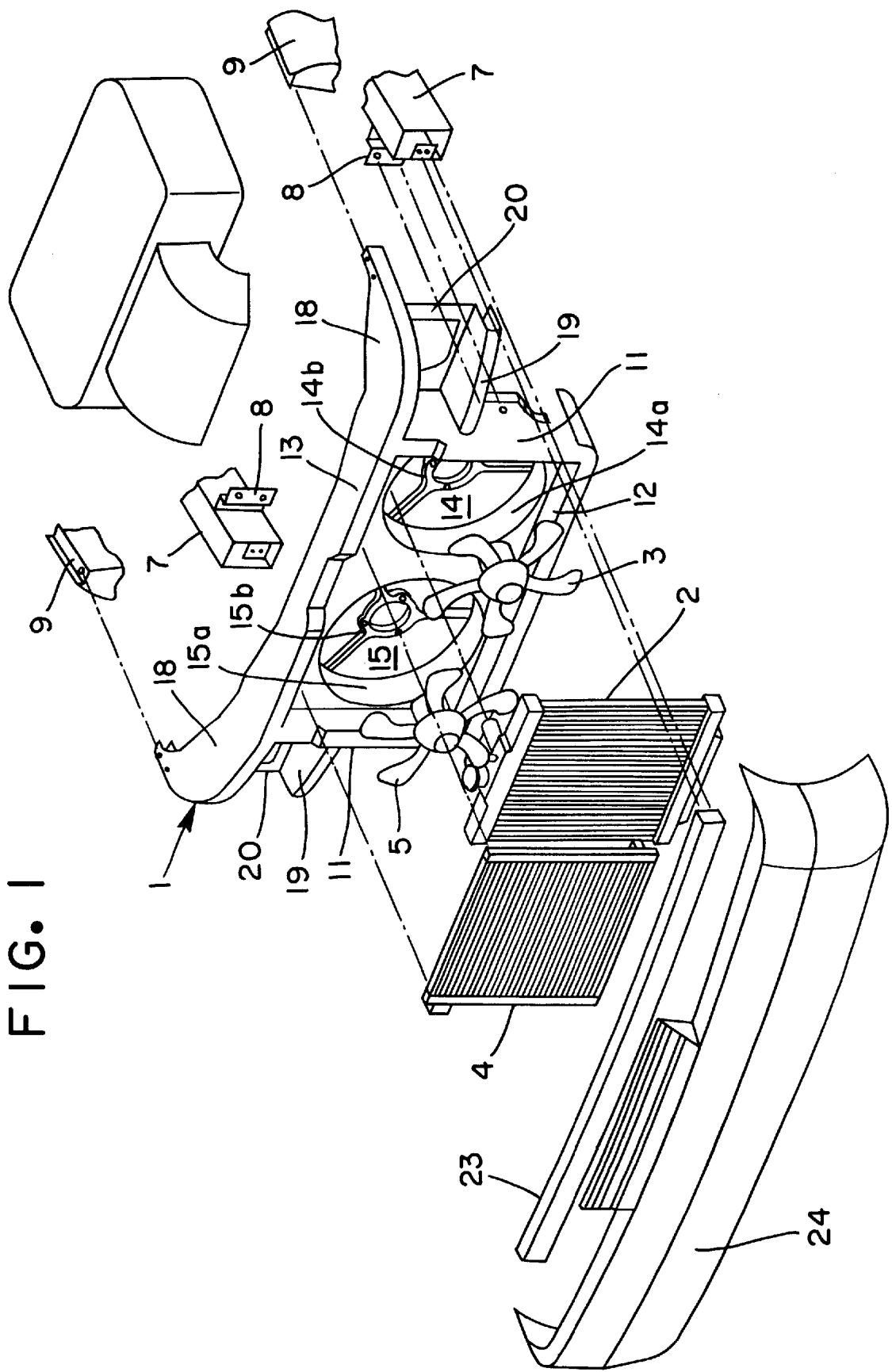
FIG. 1 is an exploded perspective view of a front end module structure of a vehicle according to the present invention.
Figure 2:
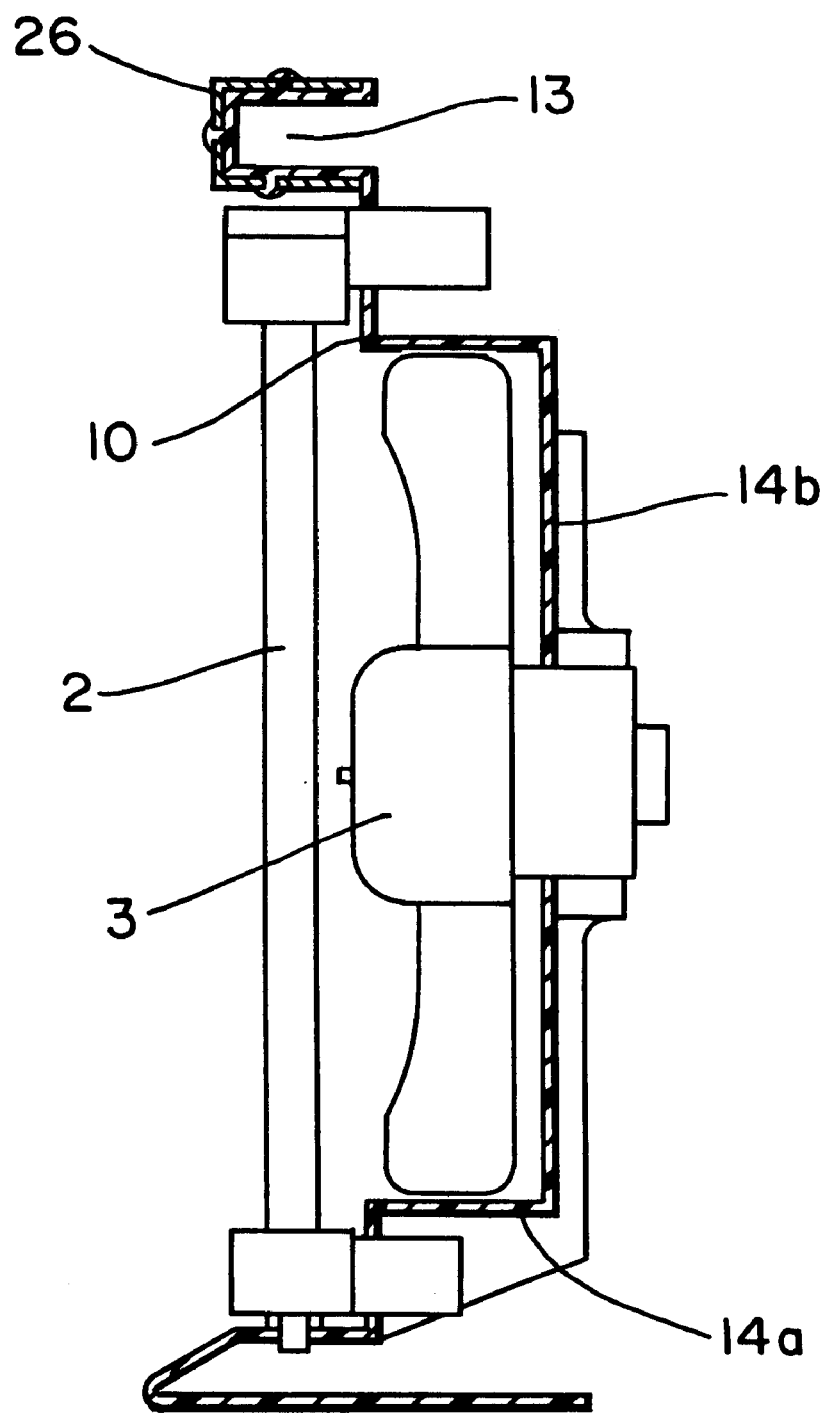
FIG. 2 is a longitudinal sectional view of a retaining portion for retaining a radiator of a front end panel of the front end module structure of the vehicle according to the present invention.
Figure 3:
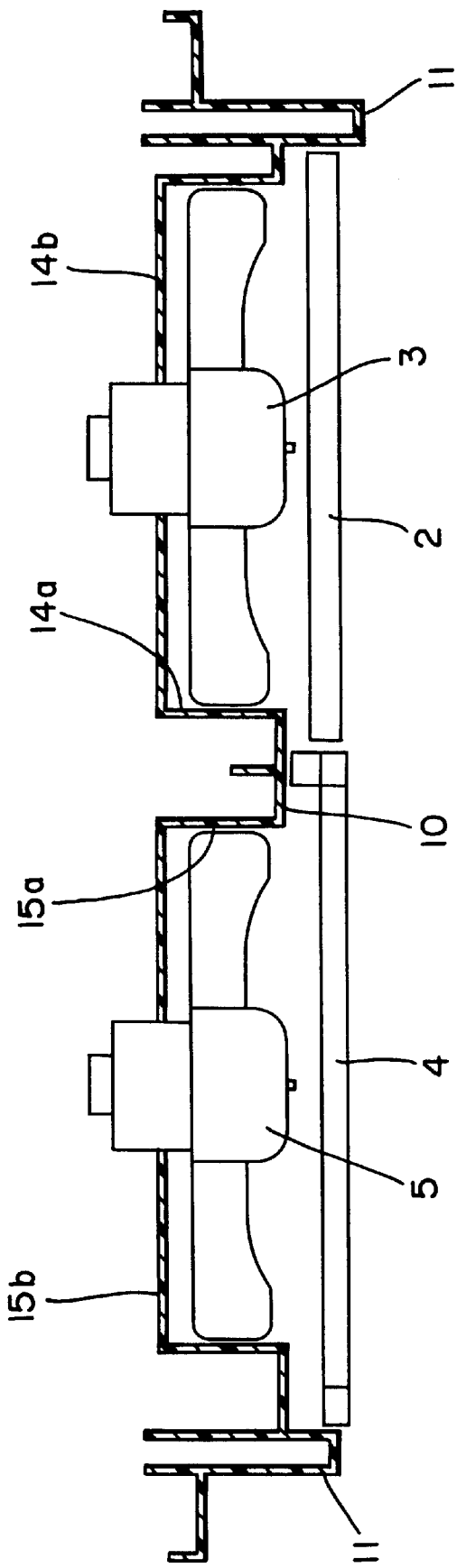
FIG. 3 is a central cross-sectional view of the retaining portion for retaining the radiator of the front end panel of the front end module structure of the vehicle according to the present invention.
Figure 4:
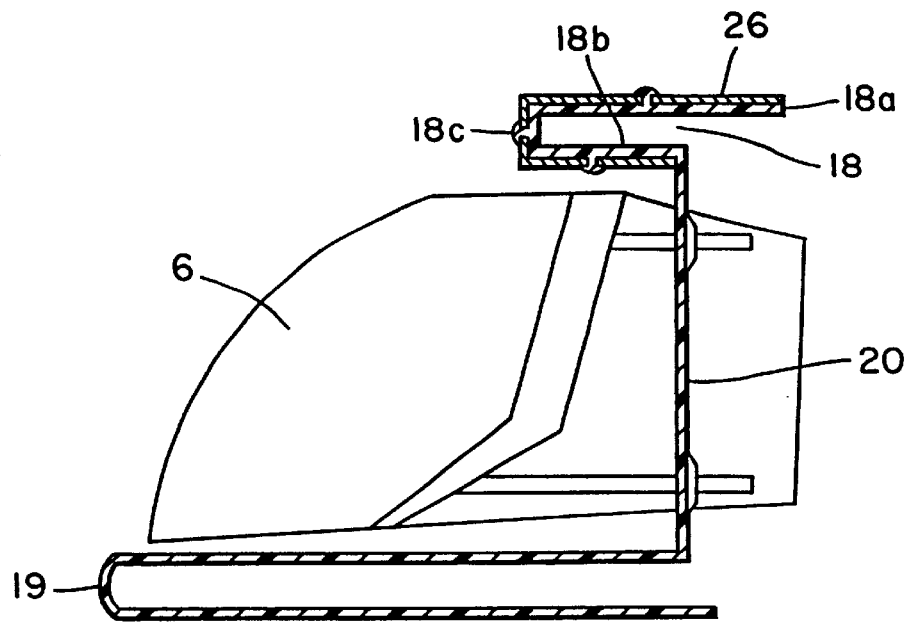
FIG. 4 is a longitudinal sectional view of a head lump retaining portion of the front end panel of the front end module structure of the vehicle according to the present invention.

As illustrated in FIGS. 1 through 5, a front end panel 1 made of a synthetic resin material retains a radiator 2 for cooling water that is intended to cool the engine of the vehicle, a radiator fan 3, a condenser 4 for cooling a refrigerant of an air conditioner, a condenser fan 5 and a pair of left and right head lamps 6. The front end panel is disposed between a pair of left and right front side members 7 of the vehicle, is mounted on the front side members 7 through brackets 8, and is fixed to a pair of left and right front end fender reinforcements 9 of the vehicle at both ends as viewed in the widthwise direction thereof.

The front end panel 1 consists mainly of a plate-like main body 10 having a rectangular configuration. On both side edges of the plate-like main body 10 as viewed in the widthwise direction of the vehicle and on a lower edge of the main body as viewed in the downward direction of the vehicle there are integrally formed rib-like flanges 11 and 12 extending, and projecting from the main body, in the back-and-forth direction of the vehicle and continuous to each other. The rib-like flanges 11 and 12 have a horizontally thrown U-shaped sectional configuration that is open in the rearward direction of the vehicle. On an upper edge of the main body 10 as viewed in the upward direction of the vehicle there is integrally formed an upper reinforcement portion 13 having a horizontally thrown U-shaped sectional configuration that is open in the rearward direction of the vehicle. This upper reinforcement portion 13 is connected to the rib-like flanges 11 and 12 continuously thereto, whereby the rigidity of the main body 1 is ensured by the rib-like flanges 11 and 12 and upper reinforcement portion 13. Also, in the main body 10, there are formed a pair of circular openings 14 and 15 having on their peripheral edges flanges 14a and 15a that project in the rearward direction of the vehicle in such a way that these circular openings 14 and 15 are adjacent to each other in the widthwise direction of the vehicle. The radiator 2 and the condenser 4 are disposed within spaces enclosed by a surface of the main body 10 (the surface situated in the frontward direction of the vehicle) and the inner surfaces of the flanges 11 and 12 situated in the frontward direction of the vehicle in such a way that the two members close the openings 14 and 15 respectively while being located in parallel in the widthwise direction of the vehicle. The radiator 2 is engaged with and fixed to the flange 12 and a flange 11 that extends from the edge of the main body 10 situated in the upward direction of the vehicle in such a way as to oppose the portion of the flange 12 situated in the frontward direction of the vehicle. Also, the condenser 4 is fastened and fixed to the main body 10 by means of bolts or the like. The radiator fan 3 is accommodated within the opening 14 on the right side of the illustration made in FIG. 1 that is closed by the radiator 2 and is rotatably supported by a supporting member 14b that is integrally extended from the flange 14a. Also, the condenser fan 5 is accommodated within the opening 15 on the left side of the illustration made in FIG. 1 that is closed by the condenser 4 and is rotatably supported by a supporting member 15b that is integrally extended from the flange 15a.

On outer side surfaces of the both rib-like flanges 11 at both side edges of the main body 10 there are integrally formed outwardly projecting ribs 18. Each rib 18 has a thickness in the up-and-down direction of the vehicle and has a width that covers in the back-and-forth direction and is configured such that this width and thickness as a whole gradually decrease toward a forward end of the rib. And, the rib 18 has a horizontally thrown U-shaped sectional configuration that is open in the rearward direction of the vehicle. The rib 18 is continuous from the upper reinforcement portion 13 so that an upper wall surface thereof may become flush with an upper wall surface of the upper reinforcement portion 13 and is fastened and fixed at its forward end to a front fender reinforcement 9 of the vehicle by a bolt or the like.

On the outer side surfaces of both rib-like flanges 11 at the both side edges of the main body 10 there are integrally formed ribs 19 two at each side of which are disposed in parallel with each other at a prescribed interval in the up-and-down direction of the vehicle. Each rib 19 has a closed section that has a thickness in the up-and-down direction of the vehicle and has a width covering in the back-and-forth direction. Also, the width of the rib 19 is larger than the width of the rib 18. The rib 19 more projects in the forward direction of the vehicle than the rib 18 and is configured such that this width thereof as a whole gradually decreases toward a forward end thereof.

The edge of the lower wall surface of the rib 18 situated in the rearward direction of the vehicle and a corresponding rear wall of the rib 19 are integrally extending to each other by a wall 20 continued from each flange 11. Each head lamp 6 is accommodated within a space enclosed by the lower wall of the rib 18, the upper wall of the rib 19, the flange 11 and the wall 20 and is fastened and fixed to the wall 20 by a bolt or the like.

Figure 5:
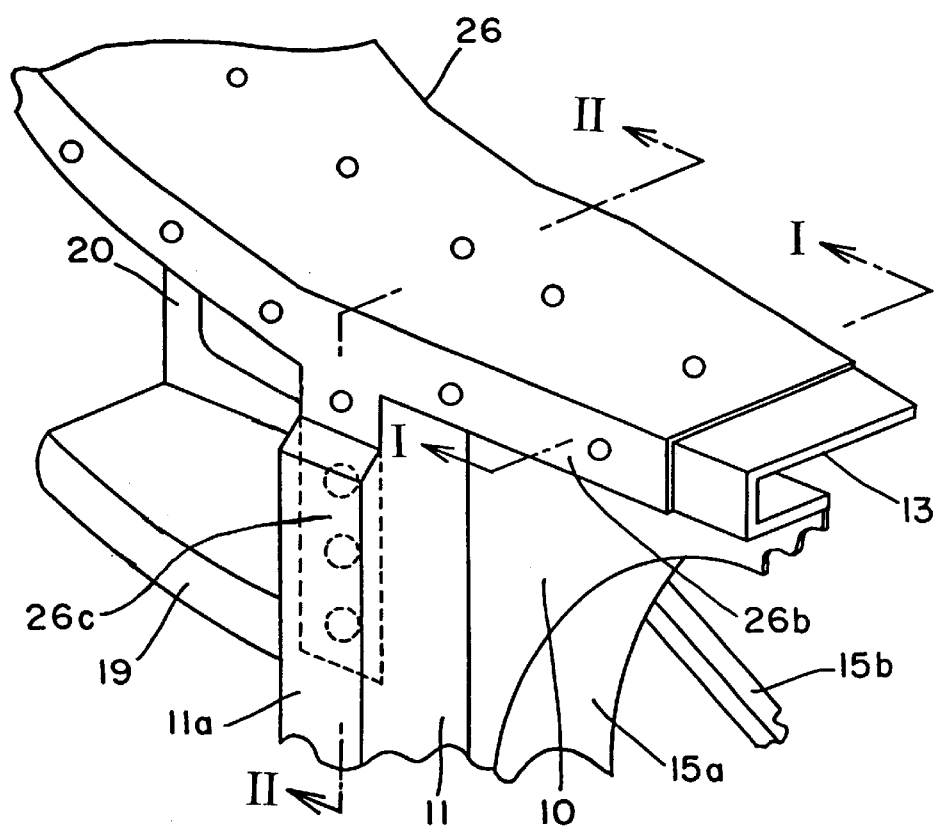
FIG. 5 is a perspective view of an upper reinforcement of the front end panel of the front end module structure of the vehicle according to the present invention.
Figure 6:
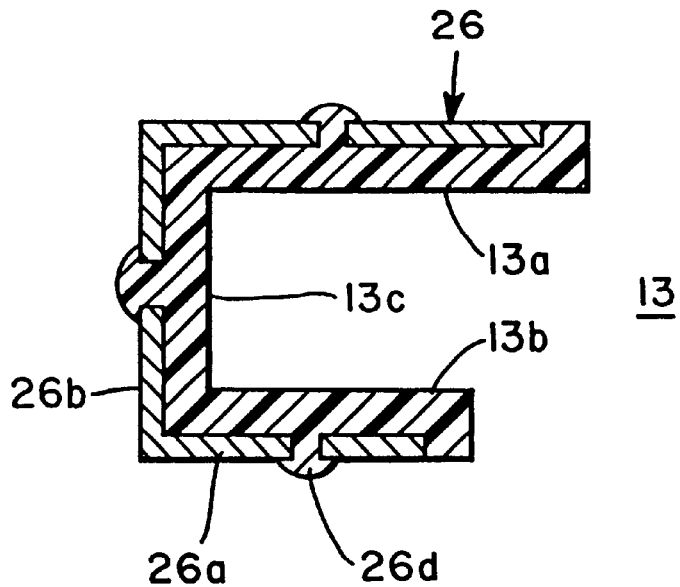
FIG. 6 is a sectional view taken along a line A—A of FIG. 5.
Figure 7:
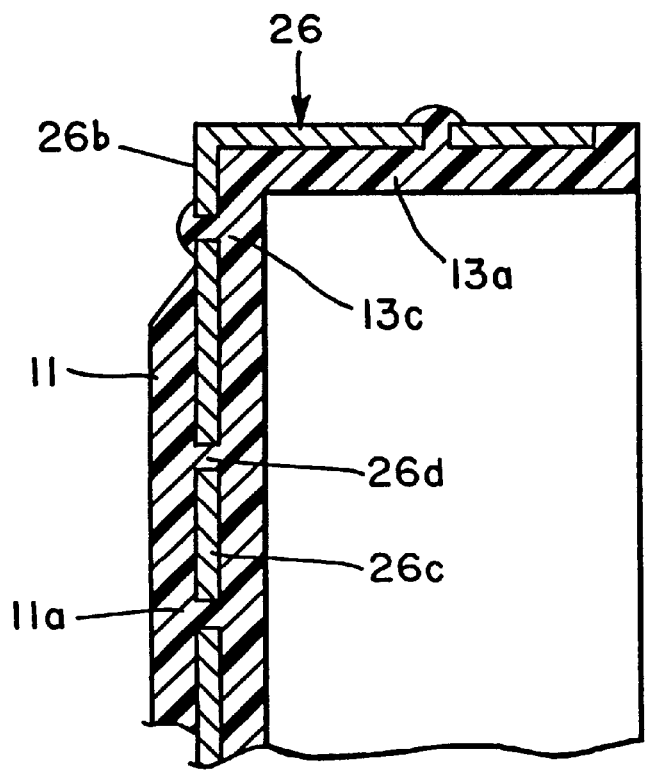
FIG. 7 is a sectional view taken along a line B—B of FIG. 5.

As illustrated in FIGS. 5 through 7, an upper reinforcement 26 made of metal is integrally disposed on the upper reinforcement portion 13 and ribs 18 of the front end panel 1. This upper reinforcement 26 has a horizontally thrown U-shaped sectional configuration similar to that of the upper reinforcement portion 13 and ribs 18 and covers upper walls 13a and 18a, lower walls 13b and 18b and front walls 13c and 18c of the upper reinforcement portion 13 and ribs 18 from outside the same. A lower wall 26a of the upper reinforcement 26 situated at each portion of connection between the upper reinforcement portion 13 and the rib-like flange 11 is cut out and folded back in the downward direction of the vehicle so as to become flush with a front wall 26b thereof and the resulting folded-back wall 26c is buried within the front wall 11a of the rib-like flange 11.

The front end panel 1 and the upper reinforcement 26 become integrated with each other through a plurality of through-holes 26d formed in the upper reinforcement 26 by fixing the upper reinforcement 26 to within a forming mold when mold-forming the front end panel 1 and, in this state, mold-forming this front end panel 1.

Since in this way the upper reinforcement portion 13 and the ribs 18 are reinforced by the upper reinforcement 26, the rigidity of the front end panel 1 is enhanced. It is to be noted that it maybe arranged to enhance the rigidity of the upper reinforcement portion 13 and ribs 18 by connecting the upper walls 13a, 18a and the lower walls 13b, 18b thereof to each other by a plurality of ribs (not illustrated) parallel with the front walls 13c, 18c.

As illustrated in FIG. 1, at a portion of the vehicle situated frontwardly from the front end panel 1, there is disposed a bumper reinforcement 23 such that this member 23 extends in the widthwise direction of the vehicle while being positioned between the front side members 7. Also, this bumper reinforcement 23 is covered by a bumper shell 24.

According to the present invention, since the metal-made upper reinforcement has been integrally provided on the resin-made upper reinforcement portion, it is possible to reinforce the upper reinforcement portion and thereby enhance the rigidity of the front end panel. As a result of this, the disposition of a bonnet lock device or the like on the front end panel becomes possible to thereby enable the provision of a simpler structure as the front end module structure.

As many apparently widely different embodiments of the present invention can be made without departing from the spirit and scope thereof, it is to be understood that the invention is not limited to the specific embodiments thereof except as defined in the appended claims.

What is claimed is:

1. A front end module structure of a vehicle, comprising:
an unitary resin-made front end panel adapted to be mounted at both ends on a pair of opposed front side members of the vehicle, the front end panel having a retaining portion for retaining at least a radiator of the vehicle thereto, an upper reinforced portion positioned over the radiator and continuously extending in a width direction of the vehicle, and opposed rib-like flanges downwardly extending from the upper reinforced portion; and
a metal-made reinforcement member molded integrally with the front end panel at a portion of the upper reinforced portion so that the metal-made reinforcement member is integrally contacted with the front end panel all along said portion of the upper reinforced portion, wherein the upper reinforced portion has a horizontally thrown U-shaped or closed sectional configuration and the metal-made reinforcement member is arranged along an outer surface of the upper reinforced portion to extend in a width direction of the upper reinforced member, and the metal-made reinforcement member has a plurality of holes in which resin material of the upper reinforced portion is integrally formed in, through and around said holes and onto the outer surface of the metal-made reinforcement member so that the resin material in the holes mechanically communicate with the metal-made reinforcement member.

2. A front end module structure according to claim 1, wherein the metal-made reinforcement member has a bent flange formed by cutting out a lower wall of the metal-made reinforcement member and downwardly extending so that the bent flange is substantially parallel with a front wall of the metal-made reinforcement member and embedded in each rib-like flange, the bent flange having a plurality of holes in which resin material of the rib-like flange is filled completely to connect the inside section of the rib-like flange with the ouside portion thereof.

3. A method for making a front end module structure of a vehicle, comprising:

adapting an unitary resin-made front end panel to be mounted at both ends on a pair of opposed front side members of the vehicle;

retaining at least a radiator of the vehicle with the front end panel having a retaining portion;

positioning an upper reinforced portion over the radiator, which is continuously extending in a width direction of the vehicle and opposed rib-like flanges downwardly extending from the upper reinforced portion; and molding the front end panel integrally with a metal-made reinforcement member at a portion of the upper reinforced portion so that the metal-made reinforcement member is integrated with the front end panel all along said portion of the upper reinforced portion, wherein the upper reinforced portion has a horizontally thrown U-shaped or closed sectional configuration and the metal-made reinforcement member is arranged along an outer surface of the upper reinforced portion to extend in a width direction of the upper reinforced member, and the metal-made reinforcement member has a plurality of holes in which resin material of the upper reinforced portion is integrally formed in, through and around said holes and onto the outer surface of the metal-made reinforcement member so that the resin material in the holes mechanically communicate with the metal-made reinforcement member.

* * * * *